(12) United States Patent
Stachowiak

(10) Patent No.: US 6,974,630 B1
(45) Date of Patent: Dec. 13, 2005

(54) COATED ARTICLE WITH NIOBIUM CHROMIUM INCLUSIVE BARRIER LAYER(S) AND METHOD OF MAKING SAME

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 209 days.

(21) Appl. No.: 10/441,258

(22) Filed: May 20, 2003

(51) Int. Cl.⁷ .............................................. B32B 9/00
(52) U.S. Cl. ...................... 428/432; 428/428; 428/433; 428/697; 428/698; 428/699; 428/704
(58) Field of Search .................. 428/34, 410, 428, 428/432, 433, 431, 589, 697, 698, 699, 704

(56) References Cited

U.S. PATENT DOCUMENTS

| | | | |
|---|---|---|---|
| 5,296,302 A | 3/1994 | O'Shaughnessy et al. | |
| 5,425,861 A | 6/1995 | Hartig et al. | |
| 5,770,321 A * | 6/1998 | Hartig et al. | 428/622 |
| 5,837,361 A | 11/1998 | Glaser et al. | |
| 5,935,702 A | 8/1999 | Macquart et al. | |
| 6,059,909 A | 5/2000 | Hartig et al. | |
| 6,322,881 B1 | 11/2001 | Boire et al. | |
| 6,355,334 B1 | 3/2002 | Rondeau et al. | |
| 6,475,626 B1 | 11/2002 | Stachowiak | |
| 6,495,263 B2 | 12/2002 | Stachowiak | |
| 6,514,621 B1 | 2/2003 | Marietti et al. | |
| 6,524,714 B1 | 2/2003 | Neuman et al. | |
| 6,558,800 B1 | 5/2003 | Stachowiak | |
| 6,576,349 B2 | 6/2003 | Lingle et al. | |
| 2002/0064662 A1 | 5/2002 | Lingle et al. | |
| 2002/0192473 A1 | 12/2002 | Gentilhomme et al. | |

FOREIGN PATENT DOCUMENTS

WO      WO 01/21540      3/2001

OTHER PUBLICATIONS

U.S. Appl. No. 10/370,060, filed Feb. 21, 2003 (copy enclosed).
U.S. Appl. No. 10/338,878, filed Jan. 9, 2003 (copy enclosed).
"Heat Insulating Glass Which Can Be Thermally Worked", Hironobu, 05124839, Oct. 1991.

* cited by examiner

*Primary Examiner*—Deborah Jones
*Assistant Examiner*—G. Blackwell
(74) *Attorney, Agent, or Firm*—Nixon & Vanderhye P.C.

(57) ABSTRACT

A coated article is provided so as to include a coating (e.g., low-E coating, or the like) having at least one layer of or including niobium chromium (NbCr). The NbCr layer may be nitrided. The NbCr inclusive layer (e.g., $NbCrN_x$) may be provided as any suitable layer of the multi-layer coating, but in certain example instances may be used as a contact layer adjacent to an infrared (IR) reflecting layer. Coated articles herein may be used in the context of insulating glass (IG) window units, laminated windows, architectural or residential monolithic window units, vehicle window units, and/or the like.

24 Claims, 3 Drawing Sheets

COATED ARTICLE WITH NIOBIUM CHROMIUM INCLUSIVE BARRIER LAYER(S) AND METHOD OF MAKING SAME

This application relates to a coated article for use in a window or the like, wherein the coated article includes a niobium chromium inclusive layer(s) (e.g., $NbCrN_x$). In certain example instances, the niobium chromium inclusive layer(s) may be used as a barrier layer or contact layer located immediately adjacent and contacting an infrared (IR) reflecting layer such as a silver inclusive layer.

BACKGROUND OF THE INVENTION

Windows including glass substrates with solar control coatings provided thereon are known in the art. Such windows may be used in the context of architectural windows, insulating glass (IG) window units, automotive windows, and/or the like.

U.S. Pat. No. 5,514,476 discloses a coated article having a layer stack of glass/SiN/NiCr/Ag/NiCr/SiN, where SiN stands for silicon nitride. While such coatings are certainly good overall coatings usable in applications such as windshields and architectural windows, they tend to be problematic in certain respects. For example, while such layer stacks with NiCr contact layers (a "contact layer" is a layer which contacts an IR reflecting layer such as silver) provide efficient solar control and are overall good coatings, the NiCr (or $NiCrN_x$) layers are lacking in terms of chemical durability. For instance, NiCr is susceptible to significant damage when exposed to acid such as HCl.

It is also known in the art to use niobium (Nb) as a material for contact layers. For example, U.S. Pat. No. 6,355,334 discloses the use of Nb as a contact layer to be provided immediately above a silver layer. U.S. Pat. No. 6,045,896 also discloses the use of Nb as a contact layer immediately above a silver layer. Unfortunately, Nb layers are also lacking with respect to chemical durability. In particular, Nb suffers damage when exposed to certain chemicals such as alkaline solutions, e.g., upon exposure to a one hour NaOH boil test for measuring durability. In commercial use, pinholes can form in dielectric layer(s) thereby exposing the contact layer(s) in certain areas; and if it is damaged by alkaline solutions this can lead to durability issues and coating failure. For example, certain photographs in U.S. patent application Ser. No. 10/370,060, filed Feb. 21, 2003 (hereby incorporated herein by reference) illustrate that Nb layers are often damaged by the one hour NaOH boil test (one hour boil in solution including about 0.1 normal NaOH solution –0.4% NaOH mixed with water—at about 195 degrees F.). For the boil test, see ASTM D 1308-87, incorporated herein by reference.

U.S. Pat. No. 5,837,361 discloses the use of a "sacrificial" alloy of NbCr immediately above a silver layer; where the purpose of the sacrificial layer is to protect the silver from oxidation during deposition of a subsequent metal oxide layer (see the third column, lines fifty to sixty-one). NbCr is a durable material. However, as explained in the '361 patent, this layer is either partially or completely oxidized after the metal oxide layer immediate over it has been deposited. Unfortunately, this oxidation of the NbCr alloy layer can cause the $\Delta E^*$ value of the coated article to be unduly high if and when heat treatment occurs. For a general description of what is meant by $\Delta E^*$ values, see U.S. Pat. No. 6,475,626, the disclosure of which is hereby incorporated herein by reference.

Accordingly, there exists a need in the art for a coated article that has improved durability and/or good $\Delta E^*$ values upon heat treatment. A non-limiting example of improved durability may be achieved by a contact or barrier layer which realizes improved resistance to alkaline solutions (e.g., compared to Nb) and/or acid such as HCl (e.g., compared to NiCr) thereby indicating improved chemical durability. It is an example purpose of certain embodiments of this invention to fulfill this need, and/or other needs which will become apparent to the skilled artisan once given the following disclosure.

BRIEF SUMMARY

In certain example embodiments of this invention, a coating or layer system is provided which includes a layer(s) comprising a nitride of niobium chromium ($NbCrN_x$). In certain example embodiments, the layer(s) comprising $NbCrN_x$ may be used as a contact layer located immediately adjacent to and contacting an IR reflecting layer such as a silver (Ag) layer. The layer(s) comprising $NbCrN_x$ may be located above and/or below the IR reflecting layer.

Surprisingly, it has been found that the addition of Cr to Nb causes the resulting layer (and thus the resulting coated article) to realize excellent chemical durability, and also excellent thermal performance. For example, the use of $NbCrN_x$ may allow the resulting coated article(s) to achieve at least one of: (a) improved chemical durability such as corrosion resistance to alkaline solutions (e.g., NaOH) and/or acid (e.g., HCl); (b) good thermal performance; (c) good mechanical performance such as scratch resistance due at least in part to the material's good affinity to both IR reflecting materials such as silver and dielectrics such as silicon nitride; and/or (d) low $\Delta E^*$ values upon heat treatment.

Certain example embodiments of this invention provide a coated article including a layer system supported by a substrate, the layer system comprising: at least first and second dielectric layers; at least one infrared (IR) reflecting layer comprising silver located between at least the first and second dielectric layers; and a layer comprising a nitride of niobium chromium located adjacent and contacting the IR reflecting layer.

Other example embodiments of this invention provide a coated article having a visible transmission of at least 10% and including a multi-layer coating supported by a glass substrate, the coating comprising: at least one IR reflecting layer comprising silver and/or gold; a contact layer comprising niobium chromium located immediately adjacent to and contacting the IR reflecting layer; and wherein the contact layer comprising niobium chromium includes from 1–70% Cr (atomic %).

DETAILED DESCRIPTION OF EXAMPLE EMBODIMENTS OF THE INVENTION

In certain example embodiments of this invention, coated articles may be provided so as to have at least one contact or barrier layer comprising a nitride of niobium chromium (NbCrN$_x$). The layer(s) comprising NbCrN$_x$ may be used as a contact layer(s) immediately adjacent an IR reflecting layer such as silver in certain example embodiments of this invention. Certain example embodiments of this invention relate to double silver stacks, while others relate to single silver stacks, or other types of layer stacks.

Coated articles herein may be used in the context of insulating glass (IG) window units, architectural window units, residential window units (e.g., IG and/or monolithic), vehicle window units such as laminated windshields, backlites, or sidelites, and/or other suitable applications.

Figure 1:
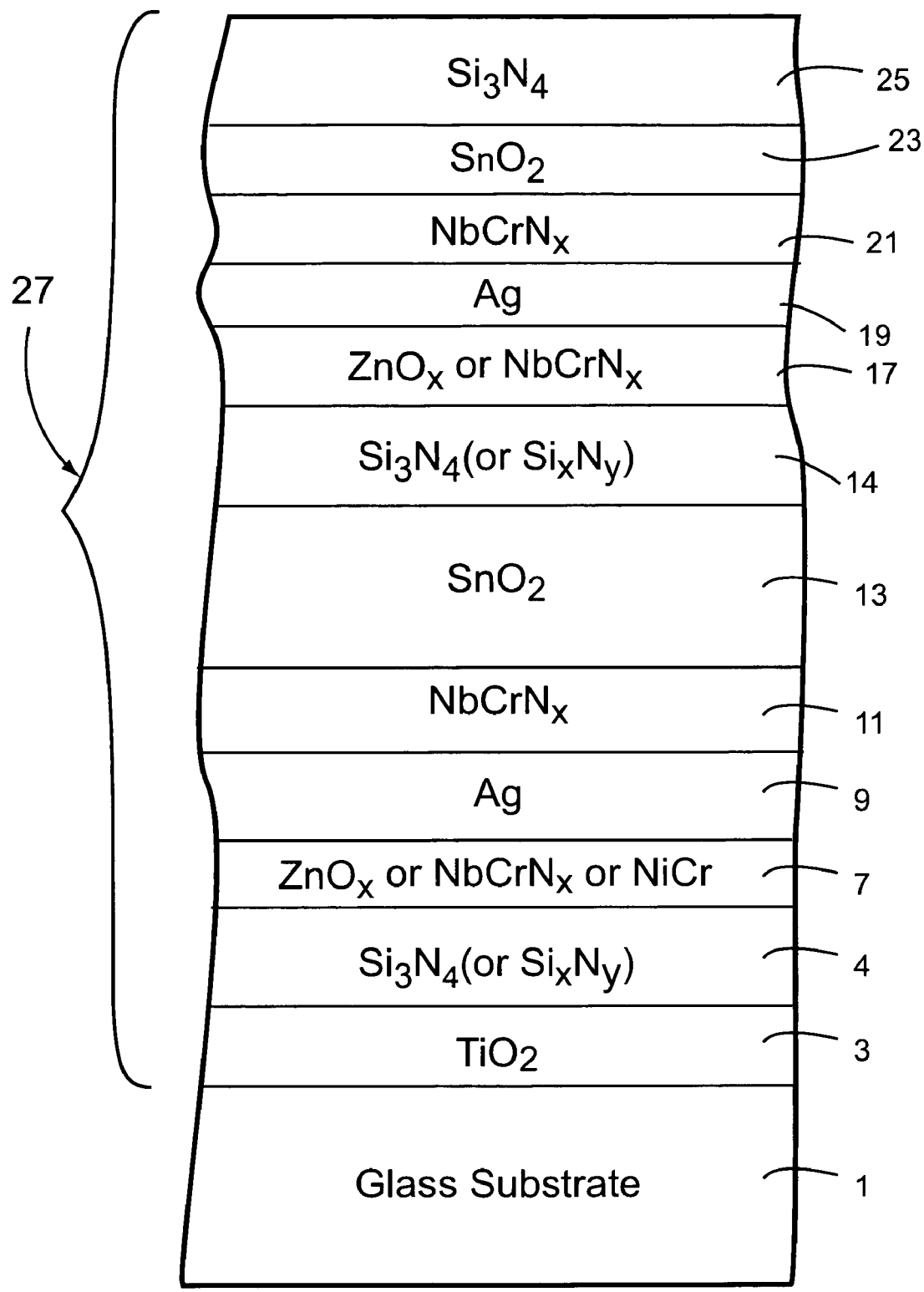
FIG. 1 is a cross sectional view of a coated article according to an example embodiment of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 2 mm to 6 mm thick), and coating (or layer system) 27 provided on the substrate 1 either directly or indirectly. The coating (or layer system) 27 may include: optional titanium oxide layer 3 (a dielectric layer), silicon nitride layer 4 which may be Si$_3$N$_4$, or a Si-rich type (another dielectric layer), first lower contact layer 7 which contacts and protects IR reflecting layer 9, first conductive and potentially metallic infrared (IR) reflecting layer 9, first upper contact layer 11 which contacts and protects IR reflecting layer 9, dielectric layer 13, another silicon nitride inclusive layer 14 (another dielectric layer), second lower contact layer 17 which contacts and protects IR reflecting layer 19, second upper contact layer 21 which contacts and protects upper IR reflecting layer 19, dielectric layer 23, and finally protective dielectric layer 25. The "contact" layers 7, 11, 17 and 21 each contact at least one IR reflecting layer (e.g., Ag inclusive layer of Ag, an Ag alloy, or the like). The aforesaid layers 3–25 make up low-E (i.e., low emissivity) coating 27 which is provided on glass or plastic substrate 1.

Infrared (IR) reflecting layers 9 and 19 are preferably metallic and/or conductive, and may comprise or consist essentially of silver (Ag), gold, or any other suitable IR reflecting material. These IR reflecting layers 9, 19 help allow coating 27 to have low-E and/or good solar control characteristics. The IR reflecting layer(s) may be slightly oxidized in certain embodiments of this invention.

One or both of the upper contact layers 11 and 21 may be of or include NbCrN$_x$. Surprisingly, it has been found that the addition of Cr to Nb causes the resulting NbCrN$_x$ inclusive layer (and thus the resulting coated article) to realize excellent chemical and mechanical durability, and also excellent thermal performance. Moreover, it is believed that nitriding the layer may improve ΔE* values upon heat treatment such as thermal tempering, heat strengthening, or the like. For example, the use of NbCrN$_x$ in one or more of the contact layers of the coating may allow the resulting coated article(s) to achieve at least one of: (a) excellent corrosion resistance to alkaline solutions such as NaOH and acid such as HCl; (b) good thermal performance; (c) good mechanical performance such as scratch resistance; and/or (d) low ΔE* values (e.g., glass side reflective) upon heat treatment. NbCrN$_x$ has been found to be surprisingly more durable than both NiCr and Nb.

One or both of lower contact layers 7 and 17 may also be of or include NbCrN$_x$ in certain example embodiments of this invention. In alternative embodiments of this invention, one or both of lower contact layers 7, 17 need not comprise NbCrN$_x$. In such alternative embodiments, one or both of lower contact layers 7, 17 may be of or include NiCr, Nb, NiCrO$_x$, ZnO$_x$, ZnAlO$_x$, Ni, NbCr, Cr or the like. In certain embodiments of this invention, it is also possible for one of the upper contact layers to be of or include one of these alternative materials. Thus, it can be seen that NbCr need not be nitrided in all embodiments of this invention.

In certain example embodiments of this invention, the Nb:Cr ratio in the NbCrN$_x$ inclusive contact layer(s) may be from about 0.4 to 90, more preferably from 0.75 to 50.0 (i.e., there may be from about 0.75 to 50.0 times as much Nb in the layer compared to Cr in the layer, with respect to atomic %). In certain example embodiments, a layer comprising NbCr (which may or may not be nitrided) may include from about 1–70 atomic % Cr, more preferably from about 1–30 atomic % Cr, and most preferably from about 3–20 atomic % Cr. It has surprisingly been found that the best thermal performance is achieved at low Cr amounts, but that Cr was especially needed for durability. For example, durability is excellent at about 20% Cr; whereas at 10% Cr, durability was still good, but below about 10% resistance to alkaline solutions decreases with Cr %, but was still visibly better than Nb or NbN down to about 1–2% of Cr content. However, stability upon HT may improve as Cr content increases. Thus, it can be seen that NbCr alloys which may be nitrided herein are advantageous in many respects. In embodiments where the contact layer(s) is of or includes NbCrN$_x$ (i.e., a nitride of NbCr), the ratio in the layer of nitrogen to the total combination of Nb and Cr may be represented, in certain example embodiments, by (Nb+Cr)$_x$N$_y$, where the ratio y/x (i.e., the ratio of N to Nb+Cr) is from 0.05 to 0.9, even more preferably from 0.3 to 0.8, still more preferably from 0.4 to 0.7. It has been found that the aforesaid y/x ratio ranges for nitrides of NbCr are particularly beneficial.

With respect to mechanical durability such as scratch resistance, in certain situations, the scratch resistance of a barrier/contact layer may not be as interesting as the scratch resistance of the overall layer system having a dielectric layer or the like on top. In such cases, for example and without limitation, it is desirable for at least one barrier/contact layer to be compatible with an overlying dielectric (e.g., be a good nucleation layer for the immediately overlying layer such as tin oxide or silicon nitride) so that the overlying dielectric can be grown dense and hard. Similarly, it is often desired that the barrier/contact layer be compatible with silver; and materials such as NiCr are sometimes problematic in this respect. According to certain example embodiments of this invention, barrier/contact layer(s) comprising NbCr (whether nitrided or not) are compatible with both silver and dielectric materials such as tin oxide and silicon nitride, thereby allowing for good mechanical durability such as scratch resistance in certain example non-limiting embodiments.

Silicon nitride inclusive dielectric layer(s) 4 and/or 14 may be provided so as to, among other things, improve heat-treatability of the coated articles (optional), e.g., such as thermal tempering or the like. Layers 4 and/or 14 may be stoichiometric silicon nitride (i.e., Si$_3$N$_4$) in certain example embodiments of this invention. However, in other embodiments of this invention, layers 4 and/or 14 may be non-stoichiometric silicon nitride such as Si-rich silicon nitride. In Si-rich embodiments, one or both of the potentially Si-rich silicon nitride layers 4 and/or 14 may be characterized by Si-rich layers described in U.S. 2002/0064662, the disclosure of which is hereby incorporated herein by reference. It has been found that the use of Si-rich silicon nitride in layer(s) 4 and/or 14 allows for haze to be reduced in certain instances.

Dielectric layer 13 acts as a coupling layer between the two halves of the coating 27, and may be of or include tin oxide in certain embodiments of this invention. However, other dielectric materials may instead be used for layer 13. Dielectric layers 23 and 25 may allow the environmental resistance of the coating 27 to be improved, and may also provided for color purposes. In certain example embodiments, dielectric layer 23 may be of or include tin oxide (e.g., $SnO_2$), although other materials may instead be used. Dielectric overcoat layer 25 may be of or include silicon nitride (e.g., $Si_3N_4$) in certain embodiments of this invention, although other materials may instead be used. Layer 23 (and/or other layers in FIG. 1), as well as other layers, may be omitted in certain example embodiments of this invention.

It is noted that the silicon nitride inclusive layers according to any embodiment herein (e.g., 4, 14 and/or 25) may optionally be doped with from about 0–20%, more preferably from about 5–10%, of a material such as aluminum or stainless steel in certain example embodiments of this invention. Even though such conductive materials may be provided in the layers 4, 14 and/or 25 in small amounts in certain instances, the layers are still considered dielectric layers herein since, among other things, they are oxide/nitride based and they are not very conductive if at all.

Other layer(s) below or above the illustrated coating 27 may also be provided. Thus, while the layer system or coating 27 is "on" or "supported by" substrate 1 (directly or indirectly), other layer(s) may be provided therebetween. Thus, for example, coating 27 of FIG. 1 may be considered "on" and "supported by" the substrate 1 even if other layer(s) are provided between layer 3 and substrate 1. Moreover, certain layers of coating 27 may be removed in certain embodiments, while others may be added between the various layers or the various layer(s) may be split with other layer(s) added between the split sections in other embodiments of this invention without departing from the overall spirit of certain embodiments of this invention. Furthermore, the materials illustrated in the drawings for the various layers and the number of layers illustrated are for purposes of example only, and are not limiting unless expressly claimed. As an example, while the dielectric layer 4 is shown as being of silicon nitride, this invention is not so limited as this dielectric layer may be of any other dielectric material such as titanium oxide, or any other suitable metal oxide and/or nitride. This applies to the other dielectric layers as well.

Figure 2:
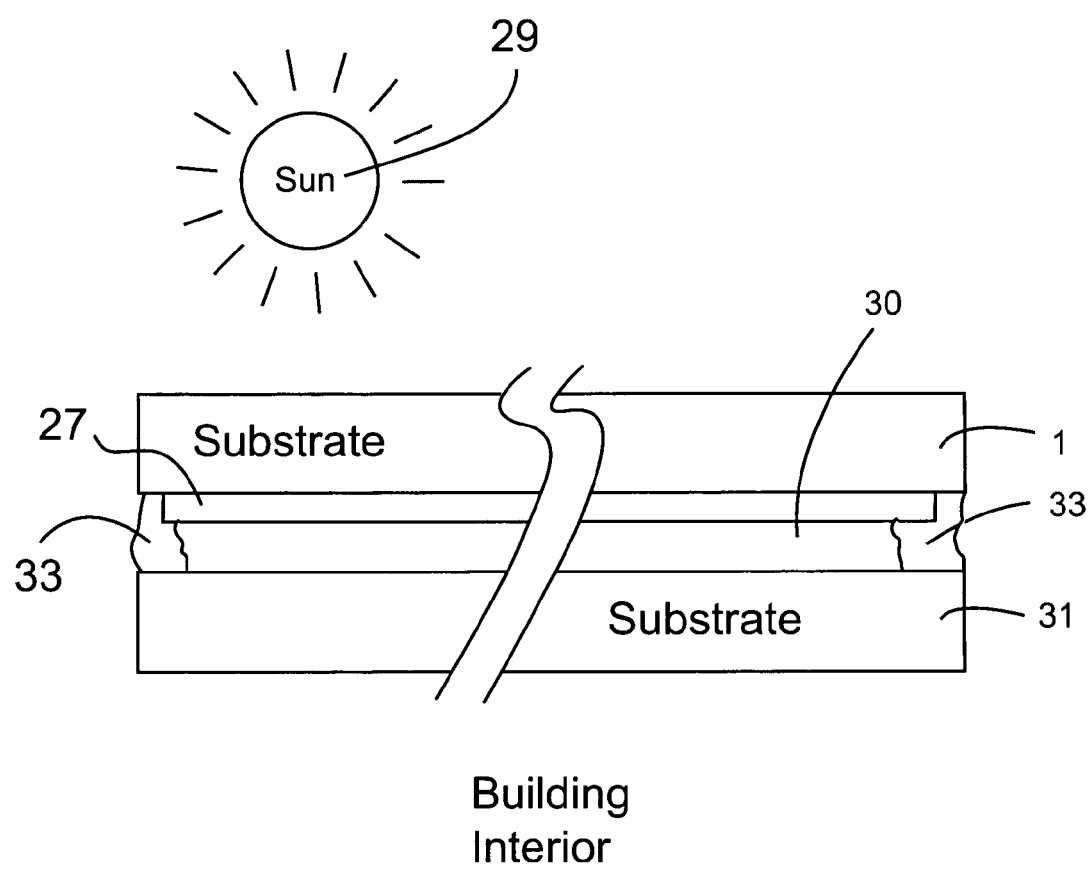
FIG. 2 is a cross sectional view of the coated article of FIG. 1 (or any other figure herein) being used in an IG window unit according to an example embodiment of this invention.

FIG. 2 illustrates the coating or layer system 27 being utilized on surface #2 of an IG window unit. Coatings 27 according to any embodiment herein may be used in IG units as shown in FIG. 2. In order to differentiate the "inside" of the IG unit from its "outside", the sun 29 is schematically presented on the outside. The IG unit includes outside glass pane or sheet (i.e., substrate 1) and inside glass pane or sheet 31. These two glass substrates (e.g. float glass 1–10 mm thick) are sealed at their peripheral edges by a conventional sealant and/or spacer 33 and may be provided with a conventional desiccant strip (not shown). The panes may then be retained in a conventional window or door retaining frame. By sealing the peripheral edges of the glass sheets and optionally replacing the air in insulating space (or chamber) 30 with a gas such as argon, a typical, high insulating value IG unit is formed. Optionally, insulating space 30 may be at a pressure less than atmospheric pressure in certain alternative embodiments (with or without a gas in space 30), although this of course is not necessary in all embodiments. While the inner side of substrate 1 is provided with coating 27 in FIG. 2, this invention is not so limited (e.g., coating 27 may instead be provided on the interior surface of substrate 31 in other embodiments of this invention).

Turning back to FIG. 1, while various thicknesses may be used in different embodiments of this invention, example thicknesses and materials for the respective layers on the glass substrate 1 in the FIG. 1 embodiment are as follows, from the glass substrate outwardly:

TABLE 1

(Example Materials/Thicknesses; FIG. 1 Embodiment)

| Layer | Preferred Range (Å) | More Preferred (Å) | Example (Å) |
|---|---|---|---|
| $TiO_x$ (layer 3) | 0–400 Å | 20–150 Å | 40 Å |
| $Si_xN_y$ (layer 4) | 0–450 Å | 90–200 Å | 113 Å |
| $ZnO_x$ (layer 7) | 10–300 Å | 40–150 Å | 100 Å |
| Ag (layer 9) | 50–250 Å | 80–120 Å | 95 Å |
| $NbCrN_x$ (layer 11) | 3–100 Å | 3–50 Å | 12 Å |
| $SnO_2$ (layer 13) | 0–1,000 Å | 350–800 Å | 483 Å |
| $Si_xN_y$ (layer 14) | 50–450 Å | 90–200 Å | 113 Å |
| $NbCrN_x$ (layer 17) | 3–100 Å | 3–50 Å | 15 Å |
| Ag (layer 19) | 50–250 Å | 80–220 Å | 131 Å |
| $NbCrN_x$ (layer 21) | 3–100 Å | 3–50 Å | 10 Å |
| $SnO_2$ (layer 23) | 0–750 Å | 70–200 Å | 100 Å |
| $Si_3N_4$ (layer 25) | 0–750 Å | 120–320 Å | 226 Å |

In certain example embodiments of this invention, coated articles herein may have the following low-E (low emissivity) characteristics set forth in Table 2 when measured monolithically (before any optional HT). The sheet resistances ($R_s$) herein take into account all IR reflecting layers (e.g., silver layers 9, 19) in the coating, unless expressly stated to the contrary.

TABLE 2

Low-E/Solar Characteristics (Monolithic; pre-HT)

| Characteristic | General | More Preferred |
|---|---|---|
| $R_s$ (ohms/sq.): | <=20.0 | <=5.0 |
| $E_n$: | <=0.20 | <=0.07 |

In certain example embodiments, coated articles herein may have the following characteristics, measured monolithically for example, after HT:

TABLE 3

Low-E/Solar Characteristics (Monolithic; post-HT)

| Characteristic | General | More Preferred |
|---|---|---|
| $R_s$ (ohms/sq.): | <=18 | <=4.5 |
| $E_n$: | <=0.18 | <=0.06 |

In certain example embodiments, the coating may have a sheet resistance ($R_s$) of less than or equal to 3.0 ohms/square, and/or a normal emissivity of less than or equal to 0.04 (before and/or after HT).

Moreover, coated articles including coatings 27 according to certain example embodiments of this invention may have the following optical characteristics (e.g., when the coating(s) is provided on a clear soda lime silica glass substrate 1 from 1 to 10 mm thick) (HT or non-HT). In Table 4, all parameters are to be measured monolithically (even though they may ultimately be used in IG units, laminated windows, or the like), unless stated to the contrary. In Table 4 below, $R_gY$ is visible reflection from the glass (g) side of the monolithic article, while $R_fY$ is visible reflection from the side of the monolithic article on which coating/film (f) (i.e., coating 27) is located. It is noted that the SHGC, SC, TS and ultraviolet transmission characteristics are to be in the context of an IG Unit (not monolithic like the rest of the data in Table 4).

TABLE 4

Example Optical Characteristics

| Characteristic | General | More Preferred |
|---|---|---|
| $T_{vis}$ (or TY) (Ill. C, 2 deg.): | >=10% | >=70% |
| $R_gY$ (Ill. C, 2 deg.): | <=20% | <=15% |
| $R_fY$ (Ill. C, 2 deg.): | <=20% | <=15% |
| $T_{ultraviolet}$ (IG): | <=50% | <=45% |
| SHGC (surface #2) (IG): | <=0.55 | <=0.50 |
| SC (#2) (IG): | <=0.60 | <=0.55 |
| TS % (IG): | <=45% | <=43% |

Figure 3:
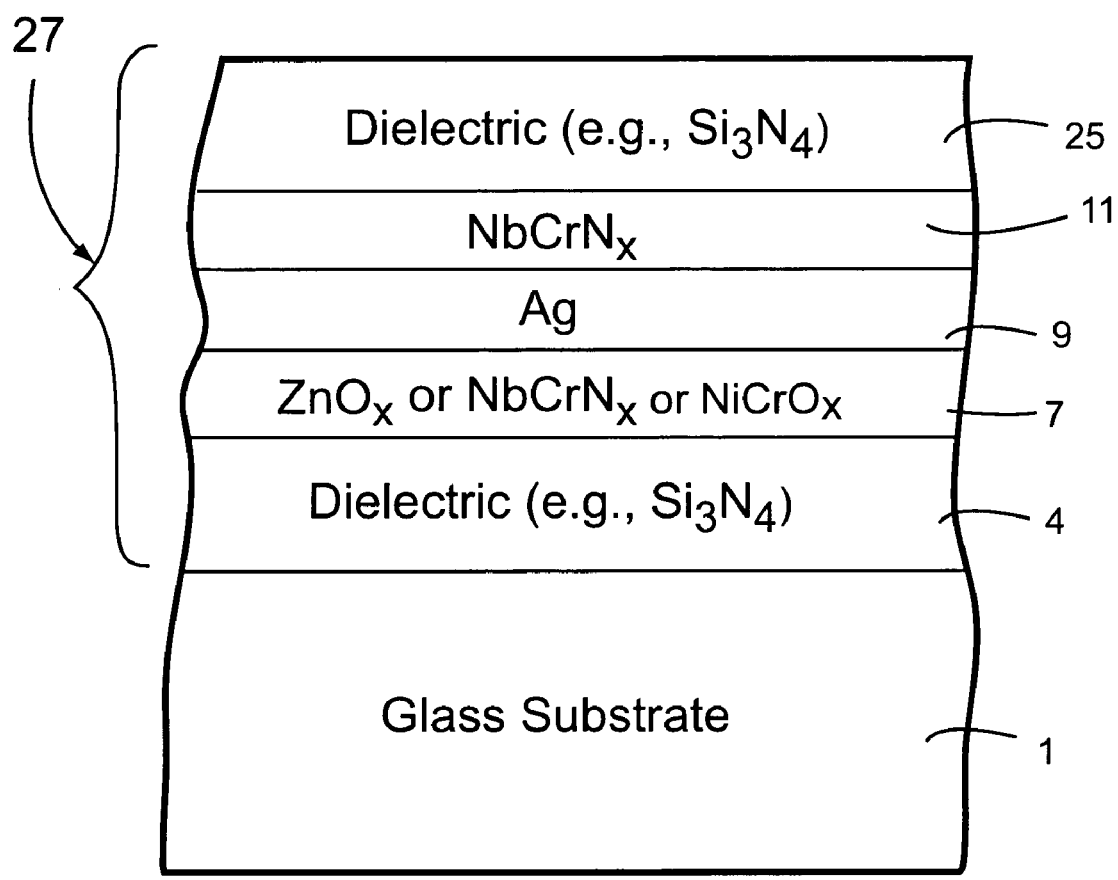
FIG. 3 is a cross sectional view of a coated article according to another example embodiment of this invention.

FIG. 3 illustrates a coated article according to another example embodiment of this invention. The FIG. 3 coated article represents a single silver layer stack, whereas the FIG. 1 coated article represents a double silver layer stack. The coating of FIG. 3 is similar to that of FIG. 1 in that it includes dielectric layer 4 (e.g., silicon nitride or some other dielectric such as a metal oxide and/or metal nitride), lower contact layer 7 (e.g., of or including NbCr, $NbCrO_x$, $NbCrN_x$, NiCr, Nb, $NiCrO_x$, $ZnO_x$, $ZnAlO_x$, Ni, Cr and/or the like), IR reflecting layer 9 (e.g., of or including Ag, Au or the like), upper contact layer 11 comprising $NbCrN_x$, and upper dielectric layer 25 (e.g., silicon nitride or some other dielectric such as a metal oxide and/or metal nitride) described above. The other layers from the FIG. 1 embodiment need not be used in the FIG. 3 embodiment. As with all other embodiments herein, the coated article shown in FIG. 3 may be used in any suitable context including but not limited to IG window units, laminated window units, monolithic window units, or the like.

The FIG. 3 embodiment is provided for the purpose of illustrating the use of a NbCr inclusive layer(s), which may be nitrided in certain embodiments of this invention, in a single IR reflecting layer coating. The materials and number of layers in FIG. 3 are not intended to be limiting, but instead are provided for purposes of example only. Other layers and/or materials may be provided and/or omitted from the FIG. 3 embodiment.

EXAMPLES

The following examples are to be formed via sputtering and are provided for purposes of example only, and are not intended to be limiting.

Example 1

In Example 1, a nitrided NbCr layer (i.e., $NbCrN_x$) was deposited via sputtering using a power of 1.0 kW, a voltage of 465 V, a line speed of 33 inches per minute (two passes), argon (Ar) gas flow of 30 sccm, and nitrogen (N) gas flow of 15 sccm (using an ILS lab coater). After two passes, this resulted in a $NbCrN_x$ layer about 230 Å thick. This may be too thick for a contact layer, but may well be used for an IR reflecting layer in a solar control coating. This example is merely for providing an example of how to deposit and form a nitrided NbCr layer, and thinner layers may be deposited by merely increasing the line speed, reducing the number of passes, and/or the like. Further details concerning such nitrided NbCr inclusive layers according to such embodiments are described in U.S. Ser. No. 10/370,060, filed Feb. 21, 2003, the disclosure of which is hereby incorporated herein by reference.

Example 2

In Example 2, a nitrided NbCr layer (i.e., $NbCrN_x$) was deposited via sputtering using a power of 1.0 kW, a voltage of 444 V, a line speed of 30 inches per minute (two passes), argon (Ar) gas flow of 30 sccm, and nitrogen (N) gas flow of 12 sccm (using an ILLS lab coater). After two passes, this resulted in a $NbCrN_x$ layer about 240 Å thick. Again, this may be too thick for a contact layer, but may well be used for an IR reflecting layer in a solar control coating. This example is merely for providing another example of how to deposit and form a nitrided NbCr layer, and thinner layers may be deposited by merely increasing the line speed, reducing the number of passes, and/or the like as will be appreciated by those skilled in the art.

Example 3

In hypothetical Example 3, a layer stack is set forth below with the layers in the stack being listed from the glass substrate outwardly:

TABLE 5

Layer Stack for Example 3

| Layer | Thickness |
|---|---|
| Glass Substrate | about 3 to 3.4 mm |
| $TiO_x$ | 40 Å |
| $Si_xN_y$ | 113 Å |
| $ZnAlO_x$ | 100 Å |
| Ag | 95 Å |
| $NbCrN_x$ | 15 Å |
| $SnO_2$ | 483 Å |
| $Si_xN_y$ | 113 Å |
| $NbCrN_x$ | 15 Å |
| Ag | 131 Å |
| $NbCrN_x$ | 15 Å |
| $SnO_2$ | 100 Å |
| $Si_3N_4$ | 226 Å |

An example process which may be used to form the coated article of Example 3 is set forth below. For this hypothetical process, the gas flows (argon (Ar), oxygen (O), and nitrogen (N)) in the below table are in units of ml/minute, and include both tuning gas and gas introduced through the main. The λ setting in the sputter coater is in units of mV, and as will be appreciated by those skilled in the art is indicative of the partial pressure of the gas being used in the sputter chamber (i.e., a lower λ setting indicates a higher oxygen gas partial pressure). Thus, for example, a lower λ setting in the case of depositing a ZnAlO layer would mean a higher oxygen gas partial pressure which in turn would mean a less metallic (more oxidized) ZnAlO layer. The linespeed could be about 5 m/min. The pressures are in units of mbar×$10^{-3}$. The silicon (Si) targets, and thus the silicon nitride layers, are doped with about 10% aluminum (Al), so as to be indicated by SiAl targets. The Zn targets in a similar manner are also doped with Al, so as to be indicated by ZnAl targets. It can be seen in Table 6 that the targets used in sputtering the layers comprising nitrides of niobium chromium are of or include Nb and Cr.

TABLE 6

Example Sputtering Process for Example 3

| Cathode | Target | Power (kW) | Ar | O | N | λ Setting | Pressure |
|---------|--------|------------|-----|-----|-----|-----------|----------|
| C11 | Ti | 34.6 | 350 | 21.6 | 0 | n/a | 3.65 |
| C12 | Ti | 35.4 | 350 | 4.56 | 0 | n/a | 4.56 |
| C15 | SiAl | 52.2 | 250 | 0 | 305 | n/a | 4.38 |
| C24 | ZnAl | 43 | 250 | 556 | 0 | 175 | 5.07 |
| C32-a | Ag | 3.1 | 250 | 0 | 0 | 0 | 3.69 |
| C32-b | Ag | 3.2 | n/a | 0 | 0 | 0 | n/a |
| C33 | NbCr | 10.0 | 250 | 0 | 200 | 0 | 3.07 |
| C41 | Sn | 46.8 | 200 | 651 | 75 | 171.4 | 5.30 |
| C42 | Sn | 44.2 | 200 | 651 | 75 | 171.4 | 6.68 |
| C43 | Sn | 45.2 | 200 | 651 | 75 | 171.4 | 6.40 |
| C44 | Sn | 49.9 | 200 | 651 | 75 | 171.4 | 6.69 |
| C45 | Sn | 39.8 | 200 | 651 | 75 | 171.4 | 5.17 |
| C52 | SiAl | 51.5 | 250 | 0 | 322 | n/a | 4.11 |
| C55 | NbCr | 10.0 | 250 | 0 | 200 | n/a | 4.37 |
| C62-a | Ag | 4.5 | 250 | 0 | 0 | n/a | 3.43 |
| C62-b | Ag | 4.6 | n/a | 0 | 0 | n/a | n/a |
| C64 | NbCr | 10.0 | 250 | 0 | 200 | n/a | 4.23 |
| C71 | Sn | 41.9 | 200 | 765 | 75 | 172 | 5.29 |
| C73 | SiAl | 54.6 | 225 | 0 | 430 | n/a | 3.93 |
| C74 | SiAl | 53.3 | 225 | 0 | 430 | n/a | 5.86 |
| C75 | SiAl | 54.4 | 225 | 0 | 430 | n/a | 2.52 |

It can be seen from the Examples above that the layers comprising nitrides of NbCr are deposited in nitride form using nitrogen gas during their respective sputtering deposition processes. Thus, according to certain example embodiments of this invention, such contact layers comprising $NbCrN_x$ are substantially uniformly nitrided throughout their respective thicknesses, before and/or after any optional heat treatment. In other words, one or more of the contact layers comprising $NbCrN_x$ are nitrided to the same extent throughout their respective thicknesses, +/−about 20%, more preferably +/−10%.

Coated articles herein may or may not be heat treated (e.g., heat strengthened, heat bent and/or thermally tempered) in different embodiments of this invention.

Certain terms are prevalently used in the glass coating art, particularly when defining the properties and solar management characteristics of coated glass. Such terms are used herein in accordance with their well known meaning. For a detailed discussion of example meanings, see U.S. patent application Ser. No. 10/400,080, filed Mar. 27, 2003, the disclosure of which is herein incorporated herein by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, and without limitation, NbCr inclusive layers herein may be oxidized in certain example instances.

What is claimed is:

1. A coated article including a layer system supported by a substrate, the layer system comprising:
   at least first and second dielectric layers;
   at least one infrared (IR) reflecting layer comprising silver located between at least the first and second dielectric layers;
   a layer comprising a nitride of niobium chromium located adjacent and contacting the IR reflecting layer; and
   wherein the layer comprising the nitride of niobium chromium comprises from 1–30% Cr.

2. A coated article including a layer system supported by a substrate, the layer system comprising:
   at least first and second dielectric layers;
   at least one infrared (IR) reflecting layer comprising silver located between at least the first and second dielectric layers;
   a layer comprising a nitride of niobium chromium located adjacent and contacting the IR reflecting layer; and
   wherein the layer comprising the nitride of niobium chromium substantially uniformly nitrided throughout its entire thickness.

3. A coated article including a layer system supported by a substrate, the layer system comprising:
   at least first and second dielectric layers;
   at least one infrared (IR) reflecting layer comprising silver located between at least the first and second dielectric layers;
   a layer comprising a nitride of niobium chromium located adjacent and contacting the IR reflecting layer; and
   wherein the layer comprising the nitride of niobium chromium is nitrided to the same degree, +/−20% or less, throughout its thickness.

4. The coated article of claim 1, wherein each of the dielectric layers comprises at least one of a nitride and a metal oxide, and wherein the layer comprising the nitride of niobium chromium is located immediately adjacent and contacting one of the dielectric layers which comprises a metal oxide.

5. The coated article of claim 1, wherein at least one of the first and second dielectric layers comprises silicon nitride.

6. The coated article of claim 1, wherein each of the first and second dielectric layers comprises silicon nitride doped with aluminum and/or stainless steel.

7. The coated article of claim 1, further comprising another layer comprising a nitride of niobium chromium, wherein the IR reflecting layer comprising silver is sandwiched between and contacts each of the respective layers comprising nitrides of niobium chromium.

8. The coated article of claim 1, wherein the coated article comprises an IG window unit.

9. The coated article of claim 1, wherein the coated article is heat treated.

10. The coated article of claim 3, wherein the layer comprising the nitride of niobium chromium comprises from 1–30% Cr.

11. The coated article of claim 1, wherein the layer comprising the nitride of niobium chromium comprises from about 3–20% Cr.

12. The coated article of claim 1, wherein the coated article has a visible transmission of at least 10%.

13. The coated article of claim 1, wherein the coated article has a visible transmission of at least 70%.

14. The coated article of claim 1, wherein the layer system has a sheet resistance of less than or equal to 20 ohms/square, before and/or after heat treatment.

15. A coated article having a visible transmission of at least 10% and including a multi-layer coating supported by a glass substrate, the coating comprising:
   at least one IR reflecting layer;
   a contact layer comprising niobium chromium located immediately adjacent to and contacting the IR reflecting layer; and wherein the contact layer comprising niobium chromium includes from 1–30% Cr.

16. The coated article of claim 15, wherein the contact layer comprising niobium chromium includes from about 3–20% Cr.

17. The coated article of claim 15, wherein the contact layer comprising niobium chromium is nitrided or metallic.

18. The coated article of claim 15, wherein the contact layer is nitrided and comprises $(Nb+Cr)_xN_y$, where the ratio y/x (the ratio of N to Nb+Cr) is from 0.2 to 0.9.

19. The coated article of claim 18, wherein the ratio y/x is from 0.3 to 0.8.

20. The coated article of claim 19, wherein the ratio y/x is from 0.4 to 0.7.

21. A coated article including a layer system supported by a substrate, the layer system comprising:
   at least first and second dielectric layers;
   at least one infrared (IR) reflecting layer comprising silver located between at least the first and second dielectric layers;
   a layer comprising a nitride of niobium chromium located adjacent and contacting the IR reflecting layer; and
   wherein the layer comprising a nitride of niobium chromium is represented by $(Nb+Cr)_xN_y$, where the ratio y/x (the ratio of N to Nb+Cr) is from 0.2 to 0.9.

22. The coated article of claim 21, wherein the ratio y/x is from 0.3 to 0.8.

23. The coated article of claim 22, wherein the ratio y/x is from 0.4 to 0.7.

24. A coated article including a layer system supported by a substrate, the layer system comprising:
   at least one infrared (IR) reflecting layer located between at least first and second nitride and/or metal oxide layers; and
   a layer comprising a nitride of niobium chromium located adjacent and contacting the IR reflecting layer, wherein the layer comprising the nitride of niobium chromium comprises from about 3–20% Cr.

* * * * *